(12) United States Patent
Baba et al.

(10) Patent No.: US 7,427,919 B2
(45) Date of Patent: Sep. 23, 2008

(54) RFID TAG SET, RFID TAG AND RFID TAG COMPONENT

(75) Inventors: Shunji Baba, Kawasaki (JP); Toru Maniwa, Kawasaki (JP); Takashi Yamagajo, Kawasaki (JP); Manabu Kai, Kawasaki (JP); Shigeru Hashimoto, Inagi (JP); Yoshiyasu Sugimura, Inagi (JP)

(73) Assignees: Fujitsu Limited, Kawasaki (JP); Fujitsu Frontech Limited, Tokyo (JP)

( * ) Notice: Subject to any disclaimer, the term of this patent is extended or adjusted under 35 U.S.C. 154(b) by 165 days.

(21) Appl. No.: 11/231,933

(22) Filed: Sep. 22, 2005

(65) Prior Publication Data
US 2006/0232418 A1    Oct. 19, 2006

(30) Foreign Application Priority Data
Apr. 15, 2005    (JP)    ............................. 2005-118081

(51) Int. Cl.
*G08B 13/14*    (2006.01)
(52) U.S. Cl. .............. 340/572.7; 340/572.8; 343/700 R
(58) Field of Classification Search ... 340/572.1–572.9; 343/700 R
See application file for complete search history.

(56) References Cited

U.S. PATENT DOCUMENTS 6,304,182 B1 * 10/2001 Mori et al. ............... 340/572.1

2006/0032926 A1 * 2/2006 Baba et al. .................. 235/492
2006/0071084 A1 * 4/2006 Detig et al. ................. 235/492

FOREIGN PATENT DOCUMENTS

JP    2002-252518    9/2002
JP    2002-298106    10/2002

OTHER PUBLICATIONS

Chinese Patent Office Action, mailed Oct. 19, 2007 and issued in corresponding Chinese Patent Application No. 200510108576.0.

* cited by examiner

*Primary Examiner*—Jeff Hofsass
*Assistant Examiner*—Edny Labbees
(74) *Attorney, Agent, or Firm*—Staas & Halsey LLP (57) ABSTRACT

An RFID tag is constructed by pasting a first component and second component together. The first component includes a tabular first base made of dielectric and a metal layer covering one of the front and back of the first base. The second component includes a sheet-like second base, a metal pattern provided on the second base and electrically connected to the metal layer of the first component to constitute a communication antenna, a circuit chip connected to the metal pattern which carries out a radio communication through the communication antenna, and an adhesive material layer which bonds the second base to the other of the front and back of the first base. The metal layer of the first component and the metal pattern of the second component are electrically connected by the conductive component.

2 Claims, 9 Drawing Sheets

RFID TAG SET, RFID TAG AND RFID TAG COMPONENT

BACKGROUND OF THE INVENTION

1. Field of the Invention

The present invention relates to an RFID tag set made up of two or more components for constructing an RFID (Radio_Frequency_IDentification) tag which exchanges information with an external device in a non-contact manner through a combination of the components, an RFID tag obtained by the RFID tag set and RFID tag components built in the RFID tag set. Note that among those skilled in the technical field of the present application, the "RFID tag" used in the present specification is regarded as an inner component (inlay) for the "RFID tag," and so it may be referred to as an "inlay for radio IC tag." Or this "RFID tag" may be referred to as a "radio IC tag." Furthermore, this "RFID tag" also includes a non-contact type IC card.

2. Description of the Related Art

Various types of RFID tags that exchange information with an external device represented by a reader/writer by radio in a non-contact manner are proposed in recent years. As a kind of this RFID tag, there is a proposal of an RFID tag having such a structure that a radio frequency communication antenna pattern and IC chip are mounted on a base sheet made of plastics or paper and such a type of RFID tag is designed to be used in a mode in which the RFID tag is pasted to an article and information on the article is exchanged with an external device to thereby identify the article.

Articles to which RFID tags are pasted may include metallic articles such as steel products and when RFID tags are pasted to such metallic articles, radio waves for communication of the RFID tags may be blocked by the metallic articles, causing the communication distance to be reduced. For this reason, Japanese Patent Laid-Open No. 2002-298106 proposes an RFID tag including an antenna pattern provided on a tabular substrate and a metal film provided on the back of the substrate and the RFID tag having such a structure can produce an effect of extending the communication distance.

However, this RFID tag described in this Japanese Patent Laid-Open No. 2002-298106 requires a tabular substrate having a thickness of $\lambda/12$ or more to produce the required effect and in the case of, for example, a UHF band (950 Hz band), $\lambda \leq 30$ cm, and the thickness of the substrate becomes approximately 2.5 cm or more. This causes the RFID tag to become too thick, making it difficult to use the RFID tag as a tag to be pasted to an article.

Furthermore, in the above described mode of use, descriptions such as the name and code of the article are supposed to be printed on the surface of the RFID tag and there is also a proposal of a printer, etc., for printing such descriptions, but the RFID tag having the substrate described in Japanese Patent Laid-Open No. 2002-298106 also has a problem that the presence of such a substrate makes difficult printing using a conventionally proposed printer.

SUMMARY OF THE INVENTION

The present invention has been made in view of the above circumstances and provides an RFID tag set capable of creating an RFID tag having a long communication distance and with ease of printing, such an RFID tag and RFID tag components to create such an RFID tag.

The present invention provides an RFID tag set made up of a plurality of components to be combined to constitute an RFID tag, including a first component having a tabular first base made of dielectric and a metal layer extending over one side of the first base, a second component having a sheet-like second base, a metal pattern provided on the second base and electrically connected to the metal layer of the first component to constitute a loop antenna, a circuit chip connected to the metal pattern which carries out a radio communication through the loop antenna, and an adhesive material layer for bonding the second base to the other side with respect to the one side of the first base and a conductive component for electrically connecting the metal layer of the first component to the metal pattern of the second component.

According to the RFID tag set of the present invention, it is possible to easily constitute an RFID tag by bonding the first component and second component using the adhesive material layer and connecting the metal layer of the first component and metal pattern of the second component using the conductive component. The RFID tag has a communication antenna made up of the metal layer of the first component and the metal pattern of the second component connected together, and therefore it is possible to obtain a long communication distance though this RFID tag is pasted to a metallic article and adopt a sufficiently thin base as the first base and second base. Furthermore, it is possible to easily construct an RFID tag with an article name, etc., printed by printing the second component using a conventional printer, etc., and then combining it with the first component, etc.

In the RFID tag set according to the present invention, it is preferable to adopt a mode in which "the adhesive material layer is bonded to the second base by covering the metal pattern, the metal layer has an end which extends to the other side of the first base and the conductive component is a conductive adhesive material constituting part of the adhesive material layer and bonded to the metal pattern of the second component, which bonds the metal pattern to the end of the first base."

According to the RFID tag set in this preferred mode, the metal layer of the first component and the metal pattern of the second component are connected through bonding between the first component and the second component to constitute an RFID tag, and therefore it is possible to easily create an RFID tag.

Furthermore, in the RFID tag set according to the present invention, it is also possible to adopt a mode in which "the second component includes the metal pattern on one side of the second base and the adhesive material layer on the other side with respect to the one side and the conductive component is a conductive adhesive tape which electrically connects the metal layer of the first component and metal pattern of the second component by being pasted to the first component and the second component extending over both components" or "the second component includes the metal pattern on one side of the second base and the adhesive material layer on the other side with respect to the one side, the metal layer includes ear sections which stick out of the first base and the conductive component is a conductive adhesive material bonded to the ear sections and pasted to the metal pattern with the ear sections folded onto the second component bonded to the first component by the adhesive material layer," or "the second component includes the metal pattern on one side of the second base and the adhesive material layer on the other side with respect to the one side and the conductive component is a metal clip which electrically connects the metal layer of the first component and the metal pattern of the second component by wrapping around the second component on the first component side."

According to the RFID tag set in these modes, it is possible to easily create an RFID tag using a procedure consisting of two stages; first, bonding of the first component and the second component, and second, electrical connection using a conductive adhesive tape, ear section and metal clip.

The RFID tag according to the present invention is provided with a first component having a tabular first base made of dielectric and a metal layer extending over one side of the first base, a second component having a sheet-like second base, a metal pattern provided on the second base and electrically connected to the metal layer of the first component to constitute a loop antenna, a circuit chip connected to the metal pattern which carries out a radio communication through the loop antenna, and an adhesive material layer which bonds the second base to the other side with respect to the one side of the first base and a conductive component which electrically connects the metal layer of the first component and the metal pattern of the second component.

Furthermore, the RFID tag component according to the present invention is an RFID tag component bonded to a first component including a tabular first base made of dielectric and a metal layer extending over one side of the first base to constitute an RFID tag, provided with a sheet-like second base, a metal pattern provided on the second base and electrically connected to the metal layer of the first component to constitute a loop antenna, a circuit chip connected to the metal pattern which carries out a radio communication through the loop antenna and an adhesive material layer which bonds the second base to the other side with respect to the one side of the first base.

Here, only basic modes of the RFID tag and RFID tag component according to the present invention have been mentioned, but this is only to avoid overlapping explanations and the RFID tag and RFID tag component according to the present invention include not only the basic modes but also various modes corresponding to the modes of the aforementioned RFID tag set.

As explained above, the present invention makes it possible to create an RFID tag having a long communication distance and with ease of printing.

DETAILED DESCRIPTION OF THE INVENTION

With reference now to the attached drawings, embodiments according to the present invention will be explained below.

Figure 1:
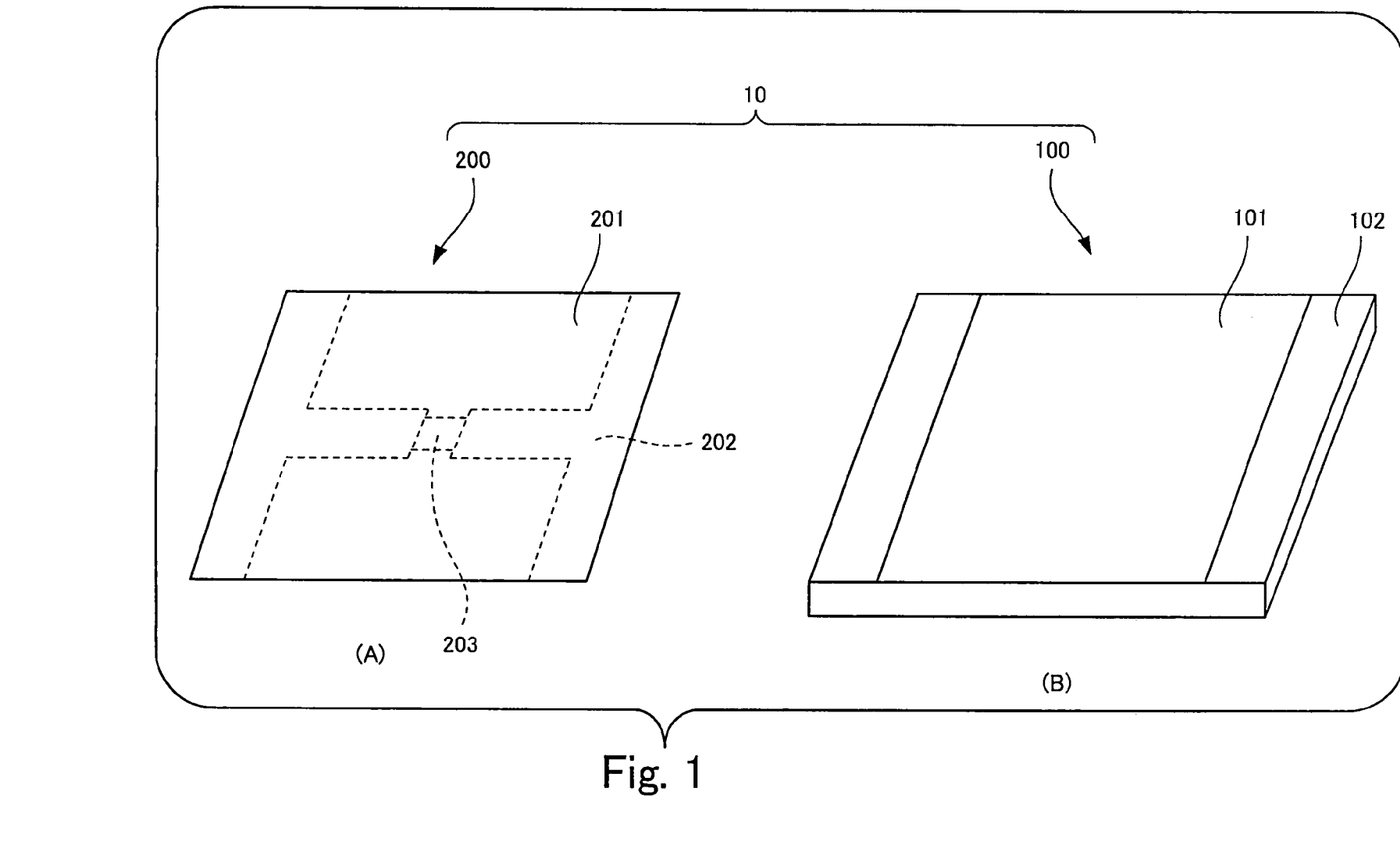
FIG. 1 is a perspective view showing the basic structure of a first embodiment of an RFID tag set according to the present invention.

FIG. 1 is a perspective view showing the basic structure of a first embodiment of an RFID tag set according to the present invention.

This RFID tag set 10 is constructed of a first component 100 shown in part (B) of FIG. 1 and a second component 200 shown in part (A) of FIG. 1 and the first component 100 has a basic structure with a ground pattern 102 provided on a base board 101. On the other hand, the second component 200 has a basic structure with an antenna pattern 202 and an IC chip 203 provided on a base sheet 201. This RFID tag set 10 is a set intended to create an RFID tag which will be described later and the RFID tag is obtained by pasting the two components together in such a way that the first component 100 is located "below" and the second component 200 is located "above." Hereinafter, the present specification will refer to the second component as the "upper" side and the first component as the "lower" side.

Figure 2:
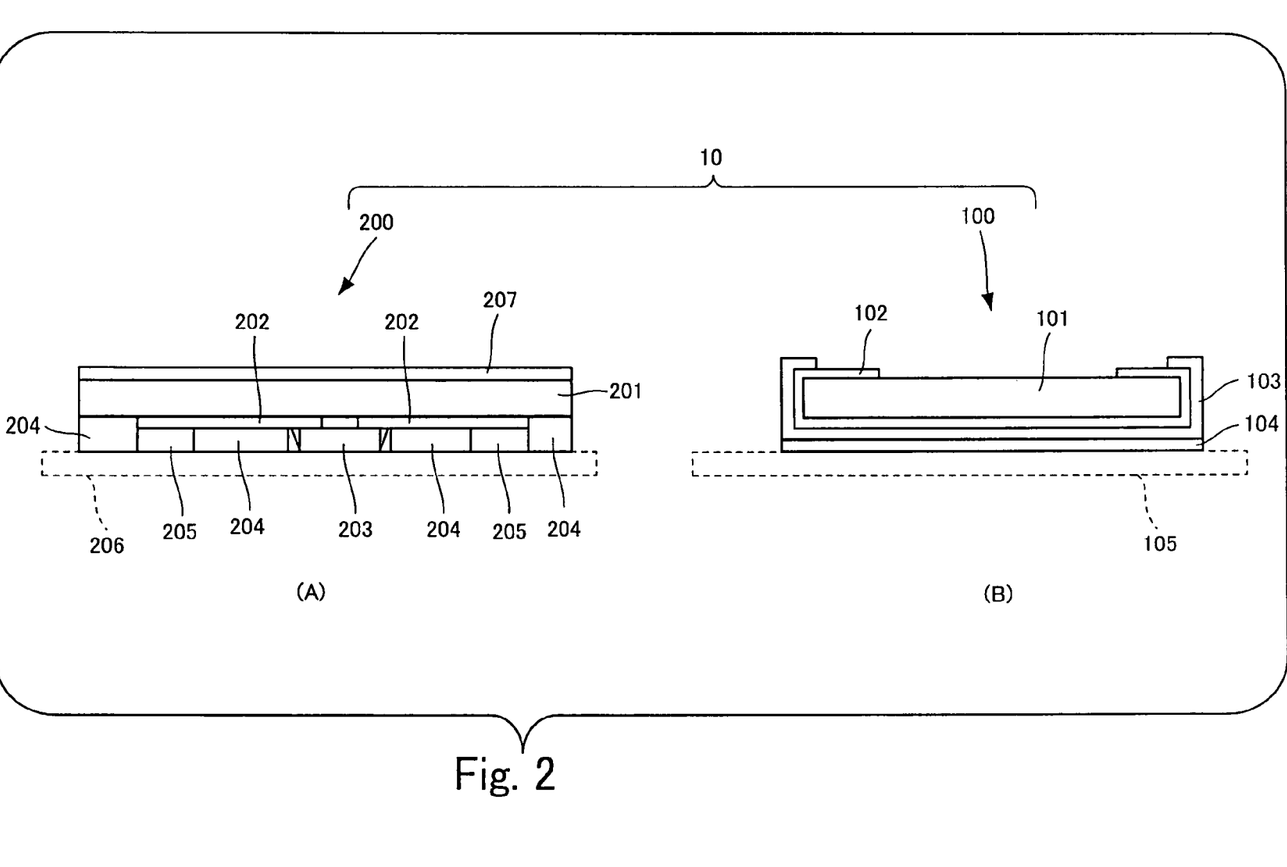
FIG. 2 illustrates a detailed structure of the first embodiment of the RFID tag set according to the present invention.

FIG. 2 illustrates a detailed structure of the first embodiment of the RFID tag set according to the present invention and the horizontal direction of this figure corresponds to the horizontal direction in FIG. 1.

The first component 100 shown in part (B) of the figure which makes up the RFID tag set 10 corresponds to an example of the first component in the present invention and is constructed of a base board 101 made of dielectric as thin as approximately 1 mm, a ground pattern 102 made of a Cu thin film covering the undersurface of the base board 101, an end of which reaches the top surface side, a PET film 103 which covers the ground pattern 102 and an insulating adhesive material 104 applied to the undersurface of the PET film 103. This first component 100 is pasted to a mount 105 through the adhesive material 104 in a detachable manner. Here, the base board 101 corresponds to an example of the first base in the present invention and the ground pattern 102 corresponds to an example of the metal layer in the present invention.

On the other hand, the second component 200 making up the RFID tag set 10 shown in part (A) of this figure corresponds to an example of the second component in the present invention and also corresponds to an embodiment of the RFID tag component in the present invention and an antenna pattern 202 made of a Cu thin film is provided on the undersurface of the base sheet 201 made of a PET material and an IC chip 203 is mounted on the antenna pattern 202 and electrically connected thereto. The base sheet 201 corresponds to an example of the second base in the present invention, the antenna pattern 202 corresponds to an example of the metal pattern in the present invention and the IC chip 203 corresponds to an example of the circuit chip in the present invention.

An insulating adhesive material 204 is applied to the undersurface of the base sheet 201 so as to cover the antenna pattern 202 and a conductive adhesive material 205 is applied to both ends of the antenna pattern 202. These adhesive materials 204, 205 constitute examples of the adhesive material layer in the present invention and moreover the conductive adhesive material 205 also corresponds to an example of the conductive component in the present invention. The second component 200 is pasted to a mount 206 through the adhesive materials 204, 205 in a detachable manner. The mount 206 has a large area and many second components 200 are pasted to this mount 206.

Furthermore, the top surface of the base sheet 201 is covered with printing paper 207 and when the mount 206 with the second component 200 pasted thereto is loaded into a printer, various descriptions are printed on the printing paper 207.

After the printing paper 207 of the second component 200 is printed, the second component 200 is peeled off the mount 206 and pasted to the first component 100 to thereby obtain the first embodiment of the RFID tag according to the present invention.

Figure 3:
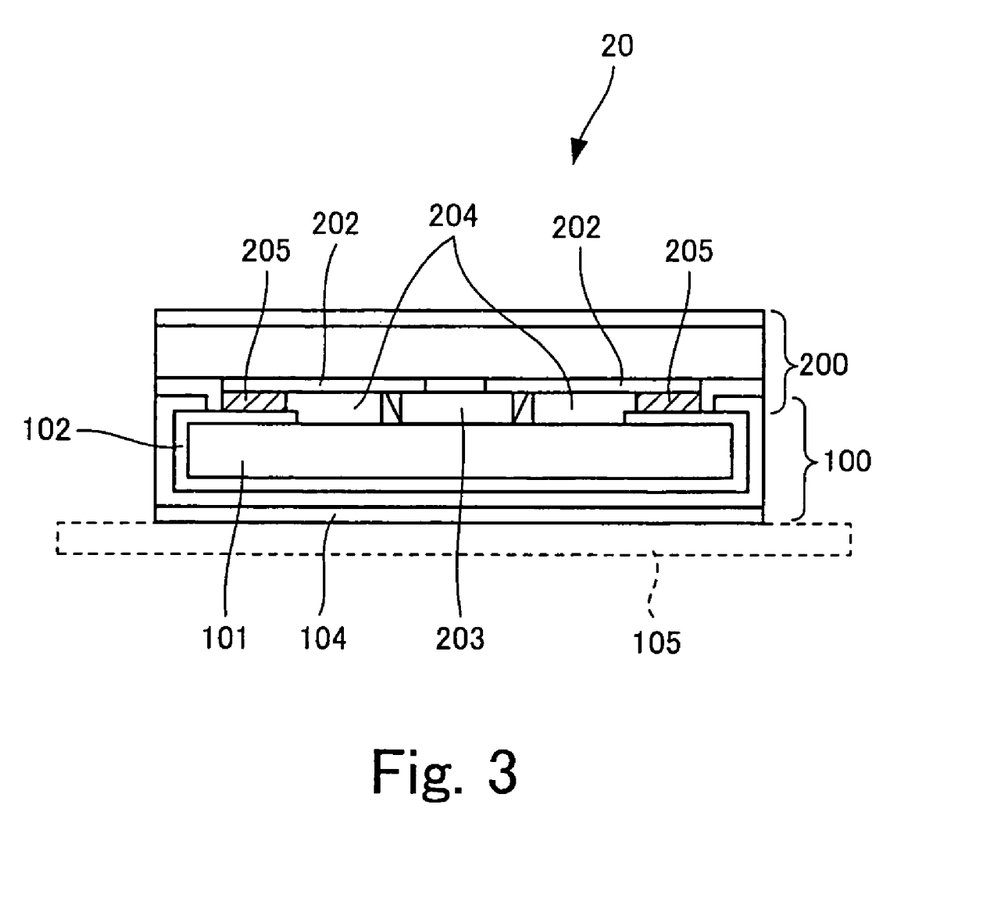
FIG. 3 illustrates a first embodiment of an RFID tag according to the present invention.

FIG. 3 illustrates a first embodiment of an RFID tag according to the present invention.

As described above, the RFID tag 20 of this first embodiment is constructed of the RFID tag set 10 of the first embodiment shown in FIG. 2 and the first component 100 and second component 200 are pasted together by the insulating adhesive material 204. Furthermore, the conductive adhesive material 205 connects the antenna pattern 202 of the second component 200 and the ground pattern 102 of the first component 100, and as a result a loop antenna is constituted. The IC chip 203 communicates with an external device through this loop antenna.

This RFID tag 20 is peeled off the mount 105 and pasted to an article to function as a tag to identify the article. Furthermore, even if the article is a metallic article, a high gain can be obtained by the above loop antenna. Even when the base board 101 is as thin as approximately 1 mm, it is possible to obtain a sufficiently long communication distance.

Another embodiment according to the present invention will be explained below.

Figure 4:
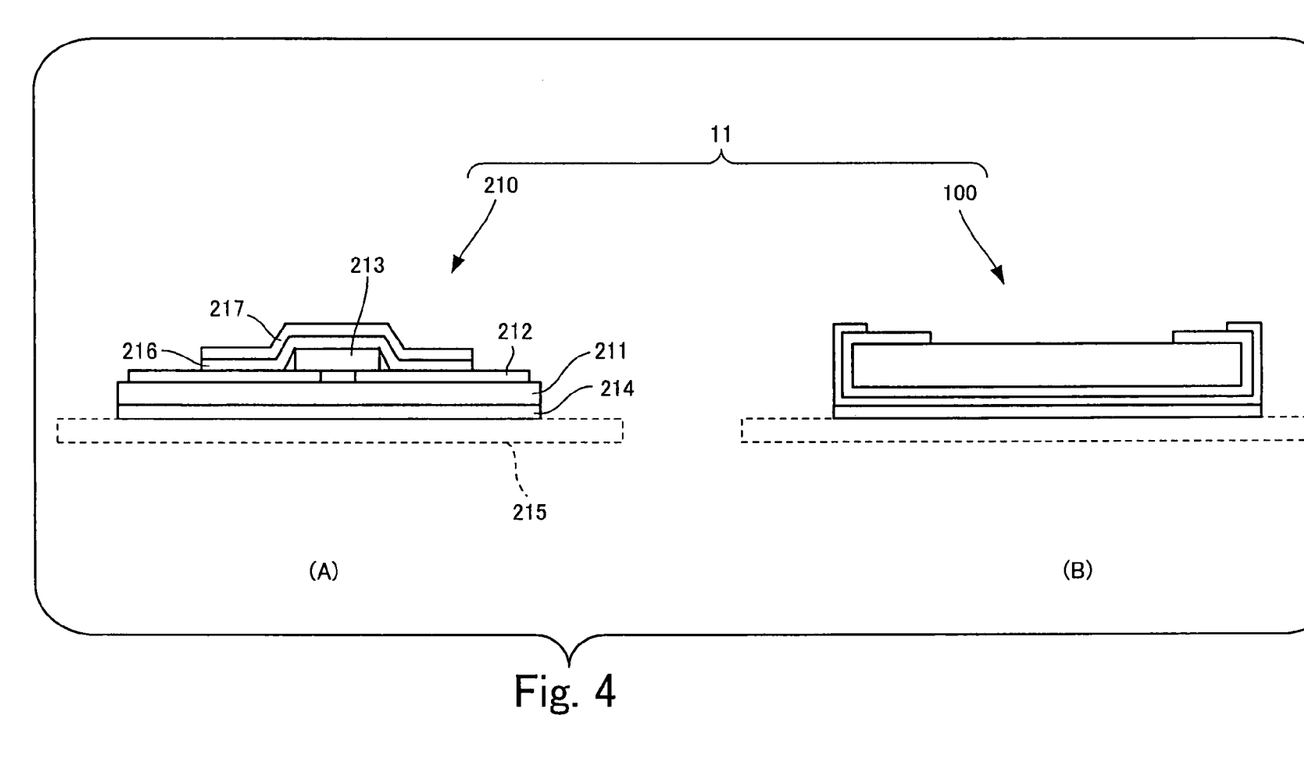
FIG. 4 illustrates a second embodiment of an RFID tag set according to the present invention.

FIG. 4 illustrates a second embodiment of an RFID tag set according to the present invention.

The RFID tag set 11 shown in this FIG. 4 is provided with a second component 210 shown in part (B) of the figure which is different from the second component of the first embodiment and a first component 100 shown in part (A) of the figure which is equivalent to the first component in the first embodiment. This second component 210 also corresponds to an example of the second component in the present invention and also corresponds to an embodiment of the RFID tag component according to the present invention.

Furthermore, the RFID tag set 11 is also provided with a conductive adhesive tape which corresponds to an example of the conductive component in the present invention, but the illustration thereof is omitted in this FIG. 4. Furthermore, the basic structure of the respective components of this RFID tag set 11 is substantially the same as the basic structure shown in FIG. 1 and the illustration of the basic structure will also be omitted.

The overlapping explanations of the first component 100 will be omitted and the detailed structure of the second component 210 will be explained.

This second component 210 is provided with an antenna pattern 212 made of a Cu thin film on the top surface of a base sheet 211 made of a PET material and an IC chip 213 is mounted on the antenna pattern 212 and electrically connected thereto. The base sheet 211 corresponds to an example of the second base in the present invention, the antenna pattern 212 corresponds to an example of the metal pattern in the present invention and the IC chip 213 corresponds to an example of the circuit chip in the present invention.

An insulating adhesive material 214 is applied to the undersurface of the base sheet 211 to constitute an example of the adhesive material layer in the present invention. As in the case of the first embodiment, the second component 210 is pasted to a mount 215 through the adhesive material 214 in a detachable manner.

Furthermore, the top surface of the base sheet 211 is covered with a PET film 216 which protects the antenna pattern 212 and IC chip 213, but both ends of the antenna pattern 212 stick out of the PET film 216. Moreover, the top surface of the PET film 216 is covered with printing paper 217 and various descriptions are printed on this printing paper 217 by a printer as in the case of the first embodiment.

After printing is performed on the printing paper 217 of this second component 210, the second component 210 is peeled off the mount 215 and pasted to the first component 100. A conductive adhesive tape is pasted to the first component 100 and second component 210 and the second embodiment of the RFID tag according to the present invention is thus obtained.

Figure 5:
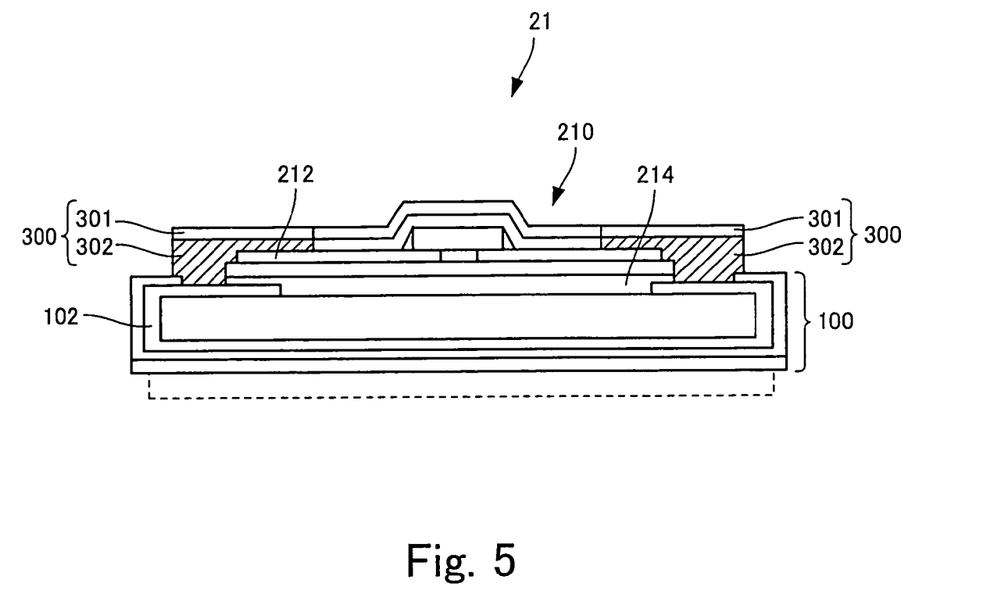
FIG. 5 illustrates a second embodiment of an RFID tag according to the present invention.

FIG. 5 illustrates a second embodiment of an RFID tag according to the present invention.

The RFID tag 21 according to this second embodiment is constructed of the RFID tag set 11 according to the second embodiment shown in FIG. 4 and the first component 100 and second component 210 are pasted together through the adhesive material 214 and a conductive adhesive tape 300 is pasted to the first component 100 and second component 210 extending to both components. The conductive adhesive tape 300 is a conductive adhesive material 302 applied to a band-shaped tape base 301 and this conductive adhesive tape 300 connects the antenna pattern 212 of the second component 210 and the ground pattern 102 of the first component 100, and as a result a high gain loop antenna is constituted as in the case of the first embodiment.

Figure 6:
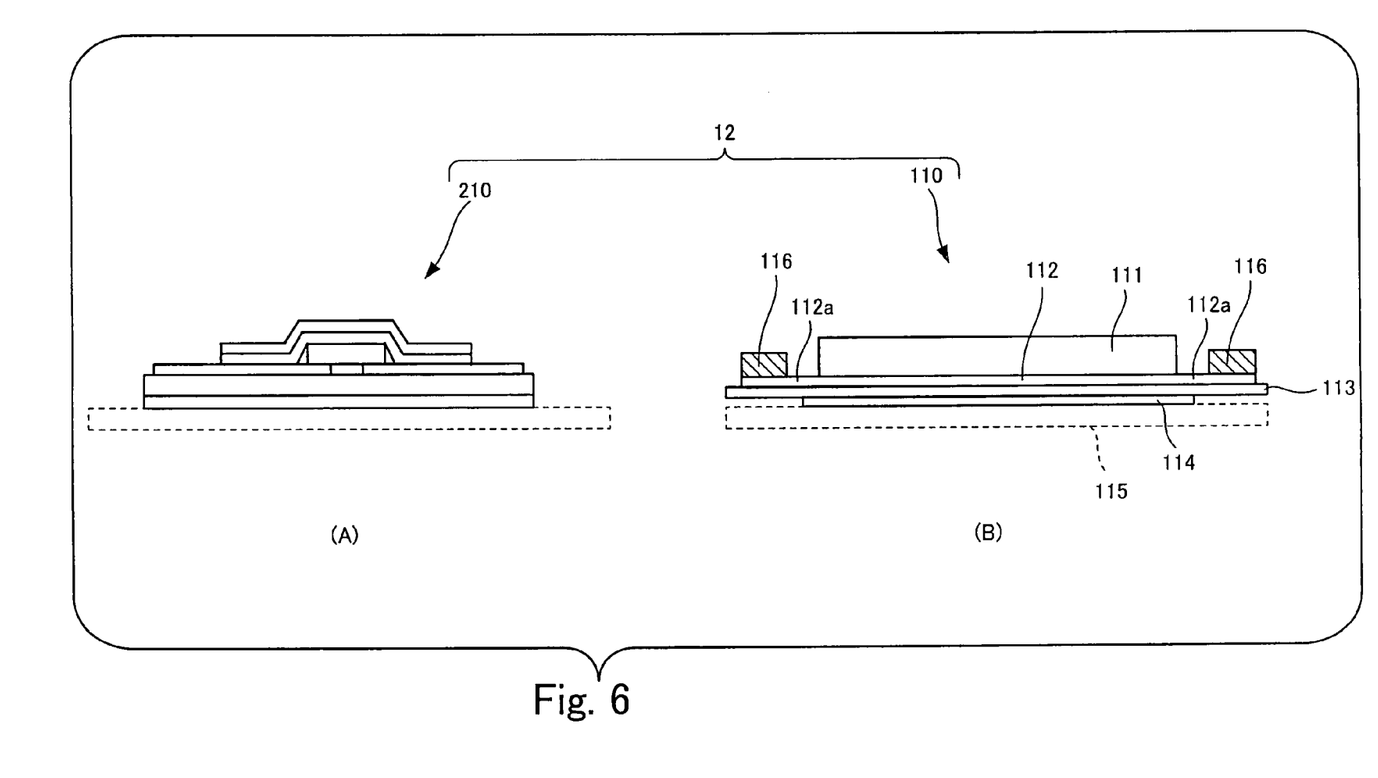
FIG. 6 illustrates a third embodiment of an RFID tag set according to the present invention.

FIG. 6 illustrates a third embodiment of an RFID tag set according to the present invention.

The RFID tag set 12 shown in this FIG. 6 is provided with a first component 110 shown in part (B) of the figure which is different from the first component according to the first embodiment and second embodiment and a second component 210 shown in part (A) of the figure which is equivalent to the second component of the second embodiment. This first component 110 also corresponds to an example of the first component in the present invention. Furthermore, the basic structure in each component of this RFID tag set 12 is also substantially the same as the basic structure shown in FIG. 1 and the illustrations of the basic structure will be omitted.

Overlapping explanations of the second component 210 will be omitted and the detailed structure of the first component 110 will be explained.

This first component 110 is provided with a base board 111 made of dielectric as thin as approximately 1 mm, a ground pattern 112 made of a Cu thin film which covers the undersurface of the base board 111, a PET film 113 which covers the undersurface of the ground pattern 112 to reinforce the ground pattern 112, and an insulating adhesive material 114 applied to the undersurface of the PET film 113, and this first component 110 is also pasted to a mount 115 through the adhesive material 114 in a detachable manner. Here, the base board 111 corresponds to an example of the first base in the present invention and the ground pattern 112 corresponds to an example of the metal layer in the present invention.

The ground pattern 112 of this first component 110 includes ear sections 112a which stick out of the base board 111 and conductive adhesive materials 116 are applied to the top surface of these ear sections 112a. This conductive adhesive material 116 corresponds to an example of the conductive component in the present invention.

The second component 210 is pasted to this first component 110 and then the ear sections 112a are folded so as to wrap around the second component 210 to thereby obtain a third embodiment of the RFID tag according to the present invention.

Figure 7:
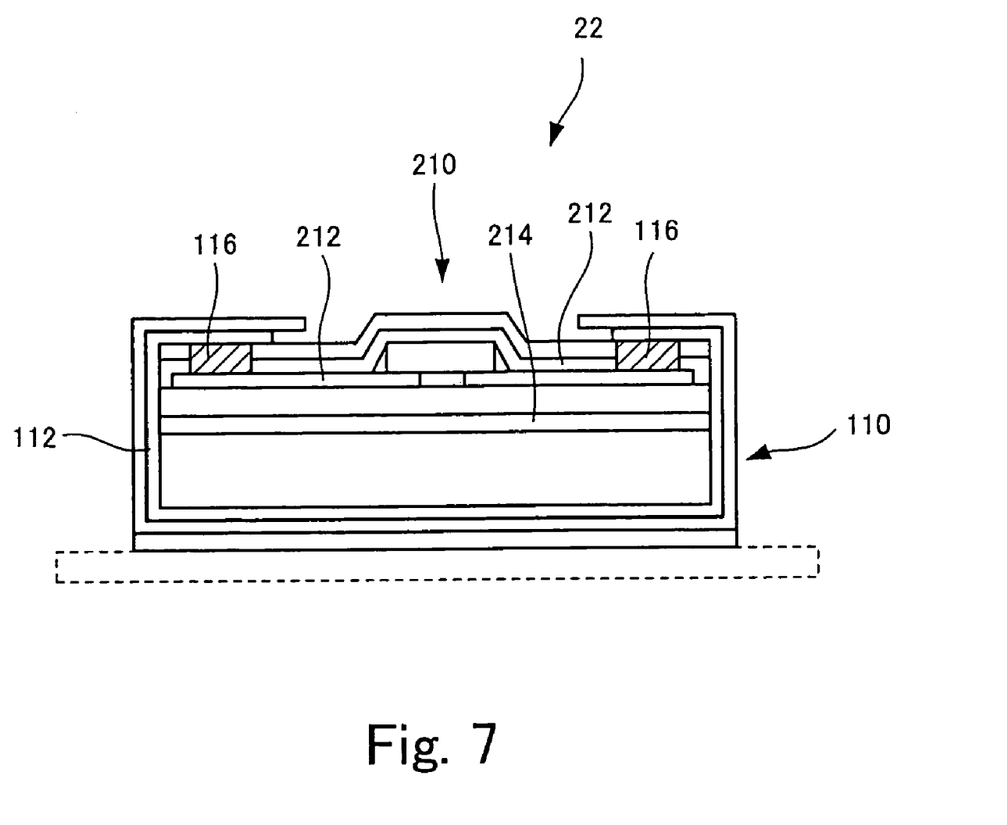
FIG. 7 illustrates a third embodiment of an RFID tag according to the present invention.

FIG. 7 illustrates a third embodiment of an RFID tag according to the present invention.

The RFID tag 22 according to this third embodiment is constructed of the RFID tag set 12 according to the third embodiment shown in FIG. 6 and the first component 110 and second component 210 are pasted together by an adhesive material 214. Furthermore, the antenna pattern 212 of the second component 210 and the ground pattern 112 of the first component 110 are connected through a conductive adhesive material 116, and as a result a high gain loop antenna is constituted as in the case of the first embodiment.

Figure 8:
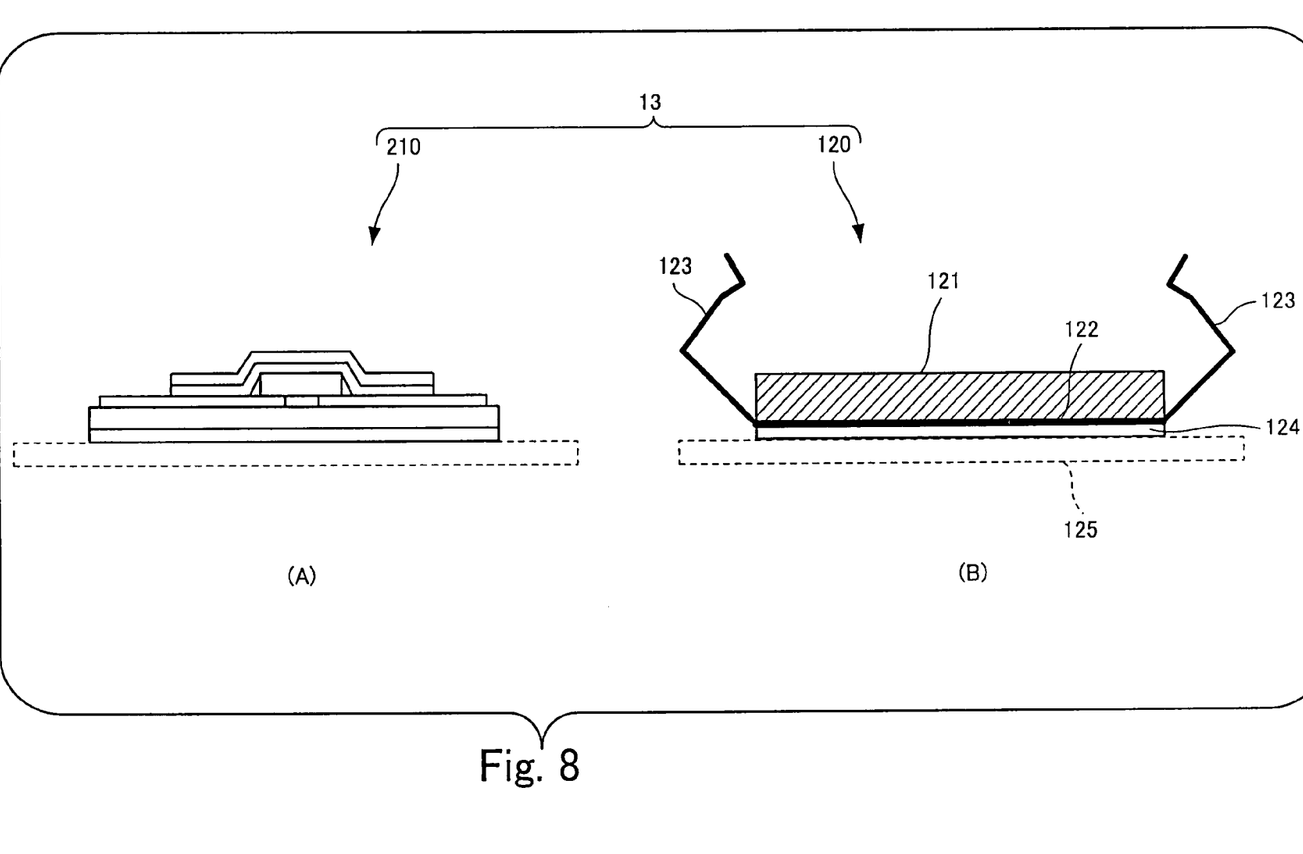
FIG. 8 illustrates a fourth embodiment of an RFID tag set according to the present invention.

FIG. 8 illustrates a fourth embodiment of an RFID tag set according to the present invention.

The RFID tag set 13 shown in this FIG. 8 is provided with a first component 120 shown in part (B) of the figure which is different from the first component of the first embodiment to third embodiment and a second component 210 shown in part (A) of the figure which is equivalent to the second component of the second embodiment. This first component 120 also corresponds to an example of the first component in the present invention. Furthermore, the basic structure of each component of this RFID tag set 13 is also substantially the same as basic structure shown in FIG. 1 and the illustrations of the basic structure will be omitted.

Overlapping explanations of the second component 210 will be omitted and the detailed structure of the first component 120 will be explained below.

This first component 120 is provided with a base board 121 made of dielectric as thin as approximately 1 mm, a ground pattern 122 made of a Cu thin film which covers the undersurface of the base board 121 and an insulating adhesive material 124 applied to the undersurface of the ground pattern 122, and this first component 120 is also pasted to a mount 125 through the adhesive material 124 in a detachable manner. Here, the base board 121 corresponds to an example of the first base in the present invention and the ground pattern 122 corresponds to an example of the metal layer in the present invention.

The ground pattern 122 of this first component 120 is connected to a metal clip 123 and this metal clip 123 corresponds to an-example of the conductive component in the present invention.

The second component 210 is pasted to this first component 120 and then the metal clip 123 is folded so as to wrap around the second component 210 and the fourth embodiment of the RFID tag according to the present invention is thus obtained.

Figure 9:
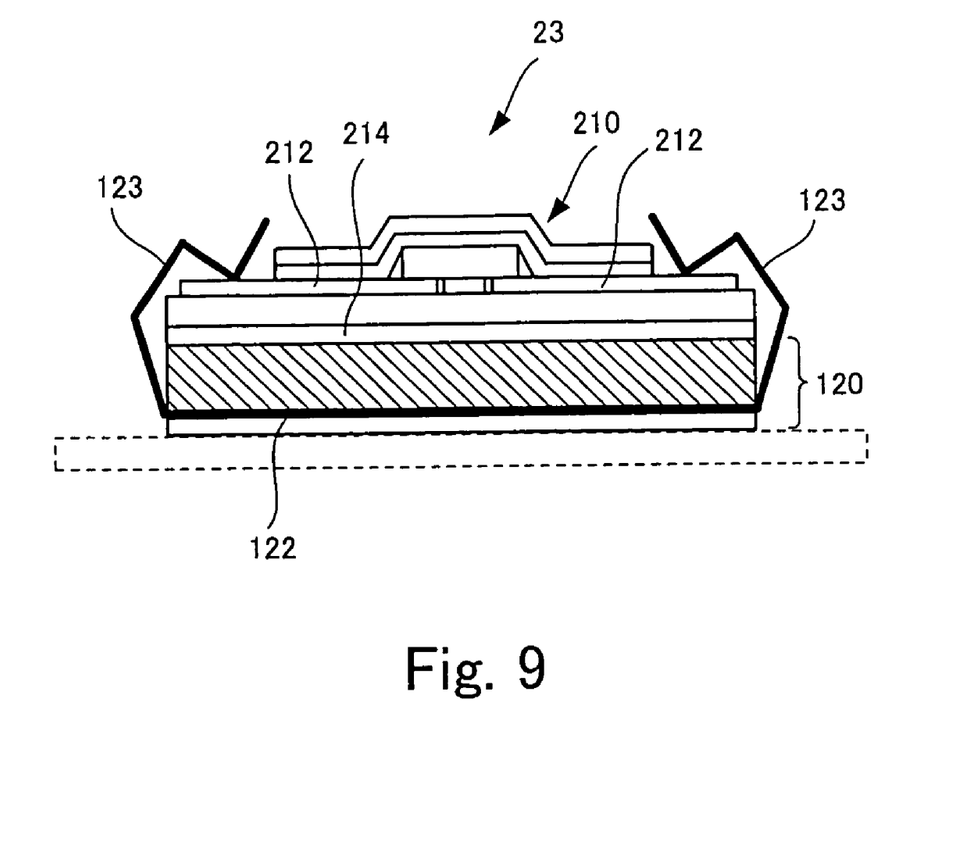
FIG. 9 illustrates a fourth embodiment of an RFID tag according to the present invention.

FIG. 9 illustrates a fourth embodiment of an RFID tag according to the present invention.

The RFID tag 23 according to this fourth embodiment is constructed of the RFID tag set 13 of the fourth embodiment shown in FIG. 8 and the first component 120 and second component 210 are pasted together through an adhesive material 214. Furthermore, an antenna pattern 212 of the second component 210 and a ground pattern 122 of the first component 120 are connected through a metal clip 123, and as a result a high gain loop antenna is constituted as in the case of the first embodiment.

The above explanation shows the ground pattern covering the undersurface of the base board as an example of the metal layer in the present invention, but the metal layer in the present invention need not cover the entire surface of the first base and can be any pattern if it at least extends over a sufficiently wide area.

What is claimed is:

1. An RFID tag set made up of a plurality of components to be combined to constitute an RFID tag, comprising:
    a first component having a tabular first base of a dielectric and a metal layer extending over a bottom major surface to opposite ends of the first base and over at least one end of the first base onto, and defining an exposed contact on, an opposite, upper major surface of the first base, and an insulting adhesive layer securing the first component to a first mount; and
    a second component having a sheet-like second base of a dielectric, a metal pattern on a bottom surface of the second base and electrically connected to the exposed contact of the metal layer of the first component to constitute a loop antenna therewith, a circuit chip connected to the metal pattern which carries out a radio communication through the loop antenna, and an adhesive non-conductive material layer bonding the second base to the upper major surface of the first base.

2. The RFID tag set according to claim 1, further comprising:
    a PET film covering the metal layer including any portion thereof extending over the bottom major surface of the first base and over each portion thereof covering a corresponding end of the first base and any portion of the metal layer extending onto the opposite, upper major surface of the first base except for the contact, each contact comprising an ear section which extends beyond the PET film and is exposed on the upper major surface of the first base; and
    a conductive adhesive connecting the metal pattern of the second component with a corresponding exposed ear section.

* * * * *

UNITED STATES PATENT AND TRADEMARK OFFICE
CERTIFICATE OF CORRECTION

PATENT NO. : 7,427,919 B2  Page 1 of 1
APPLICATION NO. : 11/231933
DATED : September 23, 2008
INVENTOR(S) : Shunji Baba et al.

It is certified that error appears in the above-identified patent and that said Letters Patent is hereby corrected as shown below:

Column 8, Line 26, change "insulting" to --insulating--.

Signed and Sealed this

Twentieth Day of January, 2009

JON W. DUDAS
*Director of the United States Patent and Trademark Office*